United States Patent
Lee et al.

(10) Patent No.: US 8,411,619 B2
(45) Date of Patent: Apr. 2, 2013

(54) METHOD OF PACKET REORDERING AND PACKET RETRANSMISSION

(75) Inventors: Jin Lee, Gyeonggi-do (KR); Yong Ho Kim, Gyeonggi-do (KR); Gi Won Park, Gyeonggi-do (KR); Ae Ran Youn, Gyeonggi-do (KR); Gene Beck Hahn, Gyeonggi-do (KR); Sung Woong Ha, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 12/678,478

(22) PCT Filed: Sep. 19, 2008

(86) PCT No.: PCT/KR2008/005572
§ 371 (c)(1),
(2), (4) Date: Mar. 16, 2010

(87) PCT Pub. No.: WO2009/038394
PCT Pub. Date: Mar. 26, 2009

(65) Prior Publication Data
US 2010/0215020 A1    Aug. 26, 2010

(30) Foreign Application Priority Data

Sep. 21, 2007 (KR) .......................... 10-2007-0096976

(51) Int. Cl.
*H04W 4/00* (2009.01)
(52) U.S. Cl. ........................................ 370/328; 370/331

(58) Field of Classification Search .................. 370/331, 370/328
See application file for complete search history.

(56) References Cited

U.S. PATENT DOCUMENTS

| 6,999,434 | B1 | 2/2006 | Agrawal et al. |
| 2004/0085926 | A1 | 5/2004 | Hwang et al. |
| 2007/0178916 | A1* | 8/2007 | Sorbara et al. ............... 455/458 |
| 2010/0039996 | A1* | 2/2010 | Ohta et al. .................... 370/328 |

FOREIGN PATENT DOCUMENTS

| KR | 1020060065349 | 6/2006 |
| KR | 1020060096928 | 9/2006 |

* cited by examiner

*Primary Examiner* — Sai-Ming Chan
(74) *Attorney, Agent, or Firm* — Lee, Hong, Degerman, Kang & Waimey

(57) ABSTRACT

A packet reordering method and a packet transmission method to implement reliable data communication are disclosed. The method of transmitting packets at a serving base station in case of a mobile station performing handover include, receiving a series of packets from an upper layer entity, and transmitting the series of packets one after the other to a target base station, wherein a packet of the series of packets includes an information field which represents whether the packet is the last transmitted packet. When the mobile station performs the I-RAT handover, the target serving station pre-reorders PDU packets, and transmits the reordered PDU packets to the mobile station, such that the mobile station can quickly transmit data without reordering the packets.

10 Claims, 9 Drawing Sheets

FIG. 5

| PDU TYPE (510) | | | PID (520) | |
|---|---|---|---|---|
| Direction (530) | Forwarded Data Indication (540) | Buffer Flush Indication (550) | Reserve (560) | |
| PDCP Sequence Number (570) | | | | |
| PDCP Data PDU Payload (580) | | | | |

METHOD OF PACKET REORDERING AND PACKET RETRANSMISSION

This application is the National Stage filing under 35 U.S.C. 371 of international application No. PCT/KR2008/005572, filed on Sep. 19, 2008, which claims the benefit of earlier filing date and right of priority to Korean application No. 10-2007-0096976, filed on Sep. 21, 2007, the contents of which are hereby incorporated by reference herein in their entirety.

TECHNICAL FIELD

The present invention relates to a wireless communication system, and more particularly to a packet reordering method and a packet transmission method to implement reliable data communication.

BACKGROUND ART

The following description relates to an exemplary situation which may occur when a terminal or a user equipment (UE) moves from one eNode-B (also called one base station) currently receiving a service to another eNode-B. If an eNode-B managing the UE is changed to another eNode-B, a handover from the eNode-Bs is carried out.

The handover occurs when a radio frequency (RF) channel currently used by a mobile station subscriber is in poor condition, or also occurs when the UE moves from a current eNode-B area to another eNode-B area.

The handover may be classified into a softer handover, a soft handover, and a hard handover according to channel switching methods.

The softer handover is carried out in one cell, and may indicate that a channel used by the UE is switched to a good channel from among channels of a UE's cell coverage. The soft handover indicates that two neighboring channels are simultaneously operated and finally one of the two neighboring channels is slowly severed. According to Code Division Multiple Access (CDMA) scheme, two or more eNode-Bs use the same frequency band, such that this soft handover can be easily implemented in the CDMA scheme. According to the hard handover, a current call-connected channel is severed, and is immediately connected to another channel.

According to the entity carrying out the above-mentioned handover, the handover may be classified into a Network Controlled Handoff (NCHO), a Mobile Assisted Handoff (MAHO), a Mobile Controlled Handoff (MCHO), etc.

The soft handover and the MAHO from among the above-mentioned schemes will hereinafter be described in detail. Needless to say, another handover method may also be used.

An Intra Radio Access Technology (I-RAT) handover supports a handover between homogeneous networks. If a UE moves from one eNode-B (i.e., a serving eNode-B) to another eNode-B (i.e., a target eNode-B) within the range of a homogeneous network, the I-RAT handover provides this UE with a seamless handover and service continuity, resulting in greater convenience of a user of the UE.

A Packet Data Convergence Protocol (PDCP) is an example of broadband mobile communication technologies, and is used as one of Universal Mobile Telecommunication System (UMTS) traffic layers. A wireless PDCP compresses header information of IP-based data streams (e.g., TCP/IP or DTP/UDP/IP-based data streams), such that it may increase the efficiency of data transmission. Also, the PDCP maintains and manages a sequence number (SN) of a radio bearer, such that it transmits user data and implements lossless SRNS re-allocation.

The PDCP layer is defined in a packet-switched area, and is located on a user plane. If the PDCP entity of the transmission end receives a PDCP Service Data Unit (PDCP SDU) from an upper layer, packet header information is compressed by a unique header compression technique, such that a PDCP Protocol Data Unit (PDCP PDU) is constructed. Individual PDCP PDUs are sequentially transmitted to a Radio Link Control (RLC) layer of a reception end in the order of receiving the individual PDCP PDUs from the upper layer, and the RLC layer may transmit data to an RLC layer of the reception end during a proper operation mode. The PDCP entity of the reception end receives the PDCP PDU from the RLC layer, and then recovers an original PDCP SDU.

However, if the UE carries out the handover, unexpected problems may occur when data is transmitted via the PDCP layer. For example, while the UE is handed over from one eNode-B to another eNode-B, a serving gateway (S-GW) may transmit user data to the UE. For example, if the UE is handed over from the serving eNode-B (S-eNB) to the target eNode-B (T-eNB), the order of data received in the target eNode-B (T-eNB) may be inconsistent with the order of other data forwarded from the serving gateway (S-GW).

That is, the user data, which is forwarded from the serving gateway (S-GW) to the UE over a mobile communication network (e.g., a 3GPP LTE network), is transmitted to the UE via the serving eNode-B (S-eNB). In this case, if the UE is handed over to the target eNode-B (T-eNB), the user data, which has been forwarded from the serving gateway (S-GW) to the serving eNode-B (S-eNB), is transmitted to the target eNode-B (T-eNB) after the completion of the handover.

In this case, the order of data received in the target eNode-B (T-eNB) may be unavoidably inconsistent with the order of other data forwarded from the serving gateway (S-GW). Also, if erroneous packet data occurs when data is transmitted and received over the PDCP layer, it is difficult to quickly recover the erroneous packet data.

DISCLOSURE

Technical Problem

Accordingly, the present invention is directed to a packet reordering method and a packet retransmission method that substantially obviate one or more problems due to limitations and disadvantages of the related art.

An object of the present invention is to provide a reliable data transmission method between a user equipment (UE) and an eNode-B (eNB) when the UE performs a handover.

Another object of the present invention is to provide a method for reordering user data by a target eNode-B (T-eNB) in order to implement reliable data communication between the UE and the eNode-B.

Yet another object of the present invention is to provide a method for rapidly recovering the loss of packets generated during the UE's handover, resulting in a guarantee of reliable transmission/reception of PDCP Data PDUs.

In order to solve the above-mentioned problems, the present invention relates to a wireless communication system, and more particularly to a packet reordering method and a packet transmission method to implement reliable data communication.

Technical Solution

To achieve these objects and other advantages and in accordance with the purpose of the invention, as embodied and broadly described herein, a method of transmitting packets at a serving base station in case of a mobile station performing handover, the method includes: receiving a series of packets from an upper layer entity; and transmitting the series of packets one after the other to a target base station, wherein a packet of the series of packets includes an information field which represents whether the packet is the last transmitted packet.

The information field further may include information indicating that the series of packets are transmitted from the serving base station.

The transmitting the series of packets to the target base station may further include, transmitting a packet data convergence protocol (PDCP) header including a sequence number, wherein the sequence number represents completion of the transmitting the series of packets, after transmitting all of the series of packets.

The sequence number may entirely consist of '1' or '0'.

The method may further include, receiving a message representing a reception status of the series of packets from the target base station; and retransmitting error detected packets considering the message to the target base station.

In another aspect of the present invention, there is provided a method of transmitting packets at a serving base station in case of a mobile station performing handover, the method comprising: receiving a first packet of a series of first packets including an information field from an upper layer entity, wherein the information field indicates whether the first packet is the last packet of the series of first packets; and transmitting the first packet of the series of first packets to a target base station, wherein the information field indicates that the first packet is the last transmitted packet.

In another aspect of the present invention, there is provided a method of transmitting reordered packets at a target base station in case of a mobile station performing handover, the method may include: receiving a series of first packets from a serving base station; receiving a series of second packets from an upper layer entity; reordering an order of the received packets; and transmitting the reordered packets to the mobile station, wherein a first packet of the series of first packets includes an information field indicating whether the first packet is the last transmitted packet, and the series of second packets have higher order than a last transmitted first packet.

The method may further include, after receiving the series of first packets from the serving base station, transmitting a message representing a reception status of the series of first packet to the serving base station; and re-receiving error detected packets of the series of first packets from the serving base station.

The method may further include, after receiving the series of second packets, storing the series of second packets in a buffer of the target base station.

The series of second packets may be stored in the buffer, and may be transmitted to the mobile station after all of the series of first packets are transmitted.

The information field included in the first packet further may include information indicating that the first packet is the last transmitted first packet from the serving base station.

The method may further include, receiving a packet data convergence protocol (PDCP) header including sequence number from the serving base station, the sequence number representing the packet transmission completion.

The sequence number may entirely consist of '1' or '0'.

In another aspect of the present invention, there is provided a method of transmitting reordered packets at a target base station in case of a mobile station performing handover, the method may include: receiving a series of first packets and a header from a serving base station, wherein the header indicates the series of first packets are entirely transmitted; receiving a series of second packets from an upper layer entity; reordering an order of the received packets; and transmitting the reordered packets to the mobile station, wherein the series of second packets have higher order than a last transmitted first packet.

The sequence number may entirely consist of '1' or '0'.

It is to be understood that both the foregoing general description and the following detailed description of the present invention are exemplary and explanatory and are intended to provide further explanation of the invention as claimed.

Advantageous Effects

The present invention has the following effects.

First, when the UE performs the I-RAT handover, the target eNode-B (T-eNB) pre-reorders PDU packets, and transmits the reordered PDU packets to the UE, such that the UE can quickly transmit data without reordering the packets.

Second, the present invention newly defines a PDCP control PDU (e.g., a PDCP Data Status Report message), and can implement reliable data communication between the UE and the eNode-B or between the serving eNode-B and the target eNode-B and can also implement reliable data communication in a communication network.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 shows yet another exemplary PDCP PDU structure for use in embodiments of the present invention;

BEST MODE

Figure 1:
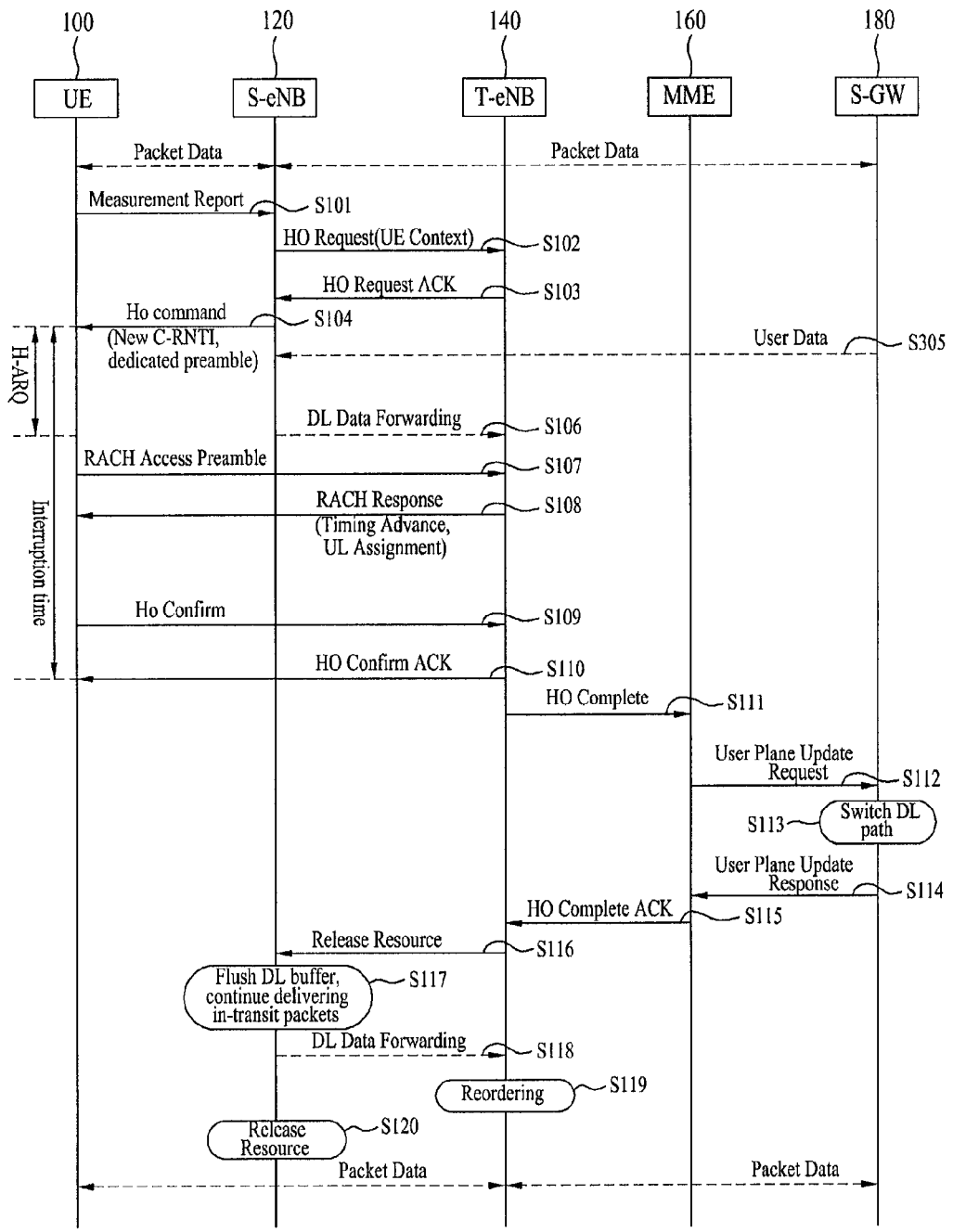
FIG. 1 is a flow chart illustrating a method for processing a handover including a process for reordering PDUs received in a target base station.

Reference will now be made in detail to the preferred embodiments of the present invention, examples of which are illustrated in the accompanying drawings. Wherever possible, the same reference numbers will be used throughout the drawings to refer to the same or like parts.

The following embodiments of the present invention relate to a packet reordering method and a packet transmission method for use in a wireless communication system, such that transmission of reliable data is implemented in case of a handover.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The following embodiments of the present invention may be supported by standard documents disclosed in at least one of various wireless access systems, for example, the IEEE 802 system, the 3GPP system, the 3GPP LTE system, and the 3GPP2 system. In other words, unexplained steps or parts for definitely disclosing the technical idea of the present invention may be supported by the above-mentioned documents. Also, all the terms or terminologies disclosed in the present invention may be explained by the above-mentioned standard documents.

Prior to describing the present invention, it should be noted that specific terms disclosed in the present invention are proposed for the convenience of description and better understanding of the present invention, and the use of these specific terms may be changed to another format within the technical scope or spirit of the present invention.

The above-mentioned embodiments of the present invention are disclosed on the basis of a data communication relationship between a base station (or Node-B or eNode-B) and a user equipment (UE). In this case, the base station is used as a terminal node of a network via which the base station can directly communicate with the user equipment (UE). Specific operations to be conducted by the base station in the present invention may also be conducted by an upper node of the base station as necessary.

In other words, it will be obvious to those skilled in the art that various operations for enabling the base station to communicate with the user equipment (UE) in a network composed of several network nodes including the base station will be conducted by the base station or other network nodes other than the base station. The term "eNode-B (eNB)" may be replaced with a fixed station, Node-B, Base Station (BS), or an access point as necessary. The term "user equipment (UE)" may also be replaced with a user terminal, a mobile station (MS) or a mobile subscriber station (MSS) as necessary.

A gateway for use in the following embodiments of the present invention is used as an upper entity capable of allowing a protocol to access different communication networks. Specifically, the gateway is indicative of one of protocol converters. In a broad sense, the gateway may be indicative of a functional unit which can control two or more different- or same-communication networks to be interconnected, such that information can be communicated between the different or same communication networks. In a narrow sense, the gateway may be indicative of a functional unit for allowing several communication networks having no compatibility due to different protocols of individual layers of the OSI basic reference model to be interconnected, such that it performs protocol conversion.

The gateway performs protocol conversion among several communication networks having different protocols, such that it can allow necessary information to be communicated among the communication networks. That is, the gateway can designate an IP address of a specific point which is used as a passage connected to the Internet on the condition that a TCP/IP network is connected to the external network. The gateway may reconstruct or change data during the transmission/reception of the data under communication environments. A gateway or serving gateway according to the present invention may be indicative of an upper entity which can control at least one base station and transmit data.

FIG. 1 is a flow chart illustrating a method for processing a handover including a process for reordering PDUs received in a target base station.

Referring to FIG. 1, a single communication system may include a user equipment (UE) 100, a serving eNode-B (S-eNB) 120, a target eNode-B (T-eNB) 140, a mobility management entity (MME) 160, and a serving gateway (S-GW) 180.

Referring to FIG. 1, the user equipment (UE) 100 transmits and receives packet data to/from the serving eNode-B (S-eNB). The serving eNode-B (S-eNB) 120 transmits and receives user data to/from the serving gateway (S-GW). The UE 100 periodically transmits a measurement report to the serving eNode-B (S-eNB) which manages a cell to which the UE 100 belongs. This measurement report may include signal intensity information or signal quality information.

If the serving eNode-B (S-eNB) 120 receives the measurement report from the UE 100, it checks the measurement result collected by the UE 100, and determines if it is preferable for the UE 100 to communicate with another eNode-B (eNB) rather than the serving eNode-B (S-eNB) 120. If the serving eNode-B (S-eNB) 120 determines that it is preferable for the UE 100 to communicate with another eNode-B rather than the serving eNode-B (S-eNB) 120, it transmits a handover (HO) request message including a UE context to the another eNode-B (i.e., a target eNode-B (T-eNB)) at step S102.

If the target eNode-B (T-eNB) 140 receives the HO request message from the serving eNode-B (S-eNB) 120, it transmits an HO request acknowledgment (ACK) message to the UE 100 in order to answer the HO request message at step S103.

At step S103, the HO request ACK message may include a cell radio network temporary identifier (C-RNTI) and a dedicated preamble. This C-RNTI is a temporary identifier assigned for allowing the target eNode-B (T-eNB) 140 to identify the UE 100. This dedicated preamble is a unique code allocated to the UE 100 by the target eNode-B (T-eNB) 140, such that it can prevent the UE from colliding with other UEs during a random access process capable of establishing synchronization between the UE 100 and the target eNode-B (T-eNB) 140.

The serving eNode-B (S-eNB) 120 loads the C-RNTI and the dedicated preamble, which are contained in the HO request ACK message received from the target eNode-B (T-eNB) 140, on an HO command message, such that the resultant HO command message is transmitted to the UE 100 at step S104.

Although the serving eNode-B (S-eNB) 120 has approved its handover to the target eNode-B (T-eNB) 140, it is determined that the handover from the serving eNode-B (S-eNB) 120 to the target eNode-B (T-eNB) 140 is not yet completed, such that the UE 100 is under the control of the serving eNode-B (S-eNB) 120. Therefore, the serving gateway (S-GW) transmits user data to the serving eNode-B (S-eNB) 120 at step S105.

The serving eNode-B (S-eNB) 120 forwards user data (i.e., downlink (DL) data) to the target eNode-B (T-eNB) 140 acting as a handover-objective eNode-B at step S106.

If the UE 100 receives the HO command message from the serving eNode-B (S-eNB) 120, it loads the dedicated preamble received from the target eNode-B (T-eNB) 140 on an RACH access preamble, and transmits the resultant RACH access preamble to the target eNode-B (T-eNB) 140, such that it can be synchronized with a cell of the target eNode-B (T-eNB) 140 at step S107.

At step S107, the random access channel (RACH) is used as a shared channel used by the UE 100 accessing a communication network. Specifically, the RACH may be used for initial access or burst data transmission.

In order to answer the RACH access preamble, the target eNode-B (T-eNB) 140 transmits an RACH response message including both a timing advance value and UL allocation information to the UE 100 at step S108. The UL allocation information may be assigned to the UE 100 by the target eNode-B (T-eNB) 140, such that the UE 100 can transmit a handover (HO) Confirm message to the target eNode-B (T-eNB) 140 using the UL allocation information.

The UE 100 transmits the HO Confirm message to the target eNode-B (T-eNB) 140 using uplink resources contained in the RACH access preamble at step S109.

Upon receiving the HO Confirm message from the UE 100, the target eNode-B (T-eNB) 140 transmits a handover (HO) Confirm ACK message to the UE 100 in order to answer the HO Confirm message at step S110. The target eNode-B (T-eNB) 140 transmits a handover (HO) Complete message to the MME 160 at step S111. It should be noted that the above steps S110 and S111 are almost simultaneously carried out.

The MME 160 allows a specific request to be contained in a User Plane Update Request message, and transmits the resultant user plane update request message to the serving gateway (S-GW) 180 at step S112. In this case, this specific request may shift a DL-data transmission path formed by both the serving gateway (S-GW) 180 and the serving eNode-B (S-eNB) 120 to the target eNode-B (T-eNB) 140.

If the serving gateway (S-GW) 180 receives the user plane update request message from the MME 160 at step S112, it switches a DL transmission path of the user data to another path at step S113, and transmits a User Plane Update Response message answering the User Plane Update request message to the MME 160 at step S114.

If the MME 160 receives the User Plane Update Response message from the serving gateway (S-GW) 180, it informs the target eNode-B (T-eNB) 140 that a user data path of the serving gateway (S-GW) 180 has been switched to another, using the HO Complete ACK message at step S115.

If the target eNode-B (T-eNB) 140 recognizes the switching of the user data path upon receiving the HO Complete ACK message from the MME 160, it transmits a release resource message to the serving eNode-B (S-eNB) 120 at step S116. In this case, the release resource message may command the serving eNode-B (S-eNB) 120 to delete all of its own information needed for implementing data communication between the serving eNode-B (S-eNB) 120 and the UE 100.

If the serving eNode-B (S-eNB) 120 receives the above-mentioned release resource message for requesting the deletion of UE information from the target eNode-B (T-eNB) 140, it deletes (or flushes) the UE information stored in a DL buffer at step S117, and forwards data packets communicating with the UE 100 to the target eNode-B (T-eNB) 140 at step S118. That is, the serving eNode-B (S-eNB) 120 performs the DL data forwarding at step S118.

The target eNode-B (T-eNB) 140 reorders user data received from the serving eNode-B (S-eNB) 120 and other user data received from the serving gateway (S-GW) 180 in regular order.

The serving eNode-B (S-eNB) 120 releases or deletes all information concerned with the UE 100 at step S120.

In FIG. 1, the method for reordering the user data packets according to one embodiment of the present invention may also be used at step S119. In more detail, when the user data remained in the S-eNB 120's buffer is transmitted to the target eNode-B (T-eNB) 140, the serving eNode-B (S-eNB) 120 informs the target eNode-B (T-eNB) 140 of the last packet data convergence protocol (PDCP) PDU transmitted to the target eNode-B (T-eNB) 140, such that the target eNode-B (T-eNB) 140 can reorder the PDCP PDU.

Figure 2:
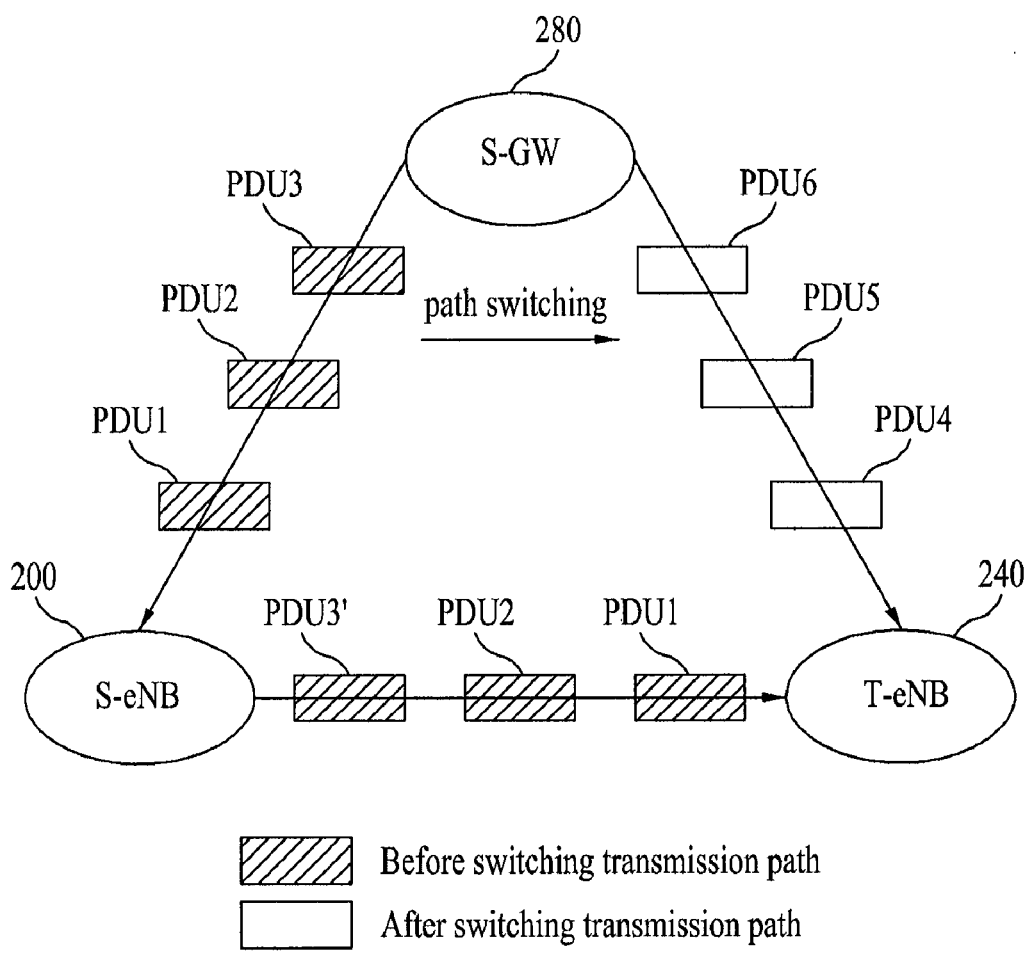
FIG. 2 is a conceptual diagram illustrating a method for controlling a serving eNode-B (S-eNB) to transmit the remaining PDCP PDUs contained in the buffer to a target eNode-B (T-eNB) on the condition that a data transmission path of a serving gateway (S-GW) is changed to another.

FIG. 2 is a conceptual diagram illustrating a method for controlling a serving eNode-B (S-eNB) to transmit the remaining PDCP PDUs contained in the buffer to a target eNode-B (T-eNB) on the condition that a data transmission path of a serving gateway (S-GW) is changed to another.

FIG. 2 illustrates a data transmission process among a serving eNode-B (S-eNB) 200, a target eNode-B (T-eNB) 240, and a serving gateway (S-GW) 280. The serving gateway (S-GW) 280 segments a service data unit (SDU) acting as user data into PDU packets according to a transmission environment, and transmits the PDU packets to the serving eNode-B (S-eNB) 200. In accordance with an exemplary embodiment of the present invention, it is assumed that the SDU acting as user data is segmented into PDCP PDU packets. In this case, it is assumed that one SDU is segmented into 6 PDUs. However, it should be noted that the number of the PDUs formed by the segmentation of the SDU may be changeable according to system requests, and this embodiment of the present invention is not limited to only the above-mentioned number of the PDUs, and may be applied to other examples as necessary.

Referring to FIG. 2, the serving gateway (S-GW) 280 sequentially transmits a first PDU (PDU1), a second PDU (PDU2), and a third PDU (PDU3) to the serving eNode-B (S-eNB) 200.

In this case, as the UE moves from one cell region to another cell region, the UE performs a handover from the serving enode-B (S-eNB) 200 to the target eNode-B (T-eNB) 240. Also, as the UE performs the above handover, the serving gateway (S-GW) 280 changes a current data transmission path for the serving eNode-B (S-eNB) 200 to another path for the target eNode-B (T-eNB) 240. Therefore, the serving gateway (S-GW) 280 sequentially transmits the remaining packets (i.e., PDU 4, PDU 5, and PDU6) of the segmented SDU to the target eNode-B (T-eNB) 240.

The serving eNode-B (S-eNB) sequentially forwards the PDU packets received from the serving gateway (S-GW) to the target eNode-B (T-eNB) 240. In this case, a specific bit indicating that a corresponding packet is the last packet may be contained in the last PDU packet of the PDU packets stored in the serving eNode-B (S-eNB) 200, such that the resultant last packet including the specific bit may be transmitted to the target eNode-B (T-eNB) 240. In other words, an information field "Final Buffer Flush Indication" may be contained in a PDCP header of the last PDU, such that the resultant PDCP header including the information field may be transmitted to the target eNode-B (T-eNB) 240. By means of the above "Final Buffer Flush Indication" field contained in the PDCP header, the target eNode-B (T-eNB) 240 may recognize that the corresponding PDU is the last PDCP PDU, which is transmitted from the serving gateway (S-GW) 280 to the serving eNode-B (S-eNB) 200 prior to the switching of a current data transmission path, and may also recognize a sequence number of the corresponding PDU acting as the last PDCP PDU.

According to another embodiment indicating that the PDU packet transmitted from the serving eNode-B (S-eNB) 200 is the last PDU packet, the serving eNode-B (S-eNB) 200 may further transmit only a PDCP header to the target eNode-B (T-eNB) 240 after transmitting all the PDU packets to the target eNode-B (T-eNB) 240. In other words, the sequence number contained in the PDCP header may entirely consist of '0' or '1', such that it may indicate that all the PDU packets stored in the serving eNode-B (S-eNB) 200 have been transmitted to the target eNode-B (T-eNB) 240.

Figure 3:
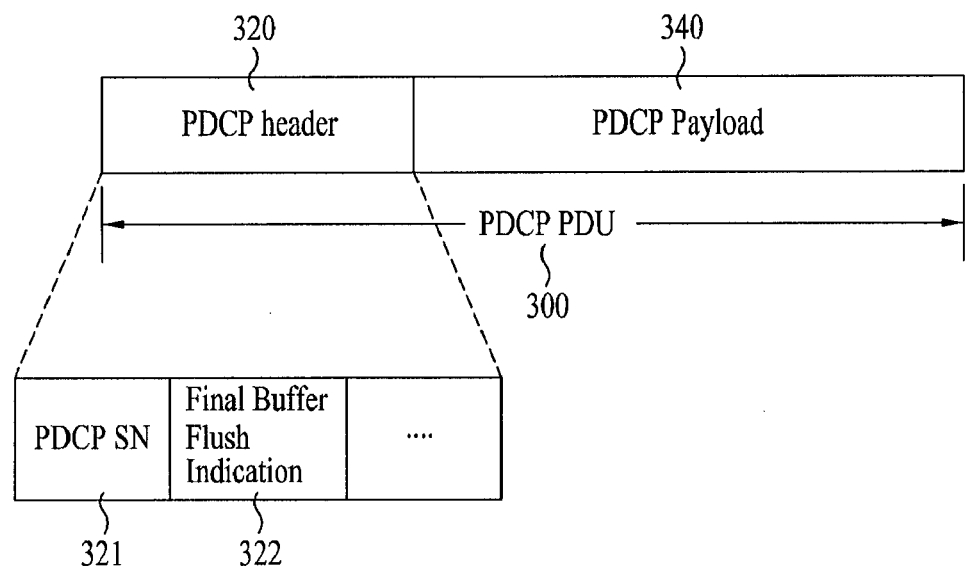
FIG. 3 shows an exemplary PDCP PDU structure for use in embodiments of the present invention.

FIG. 3 shows an exemplary PDCP PDU structure for use in embodiments of the present invention.

Referring to FIG. 3, a PDCP PDU packet 300 may include a PDCP header 320 and a PDCP payload 340. The PDCP header 320 may include a Packet Indication (PID) field and a PDU-type field. The PDU-type field may indicate whether a corresponding PDU is a data packet or a sequence-number PDU. The PID field may indicate a protocol type used for header compression, a packet type, or a connection identifier (CID).

Referring to FIG. 3, the PDCP header 320 may include a PDCP sequence number (PDCP SN) 321 and a "Final Buffer Flush Indication" field 322 indicating the last PDU packet. If the PDU packet received from the serving eNode-B (S-eNB) includes the "Final Buffer Flush Indication" field 322, the target eNode-B (T-eNB) may recognize that the received PDU packet is the last PDU packet. Therefore, the target eNode-B (T-eNB) may reorder a plurality of packets using the "Final Buffer Flush Indication" field 322.

For the convenience of description, it is assumed that the "Final Buffer Flush Indication" field 322 has one bit (i.e., 1 bit). In this case, if the "Final Buffer Flush Indication" field 322 is set to "1", it can be recognized that a corresponding PDCP PDU packet is equal to the last transmitted packet. Otherwise, if the "Final Buffer Flush Indication" field 322 is set to "0", it can be recognized that the corresponding PDCP PDU packet is not equal to the last transmitted packet.

Figure 4:
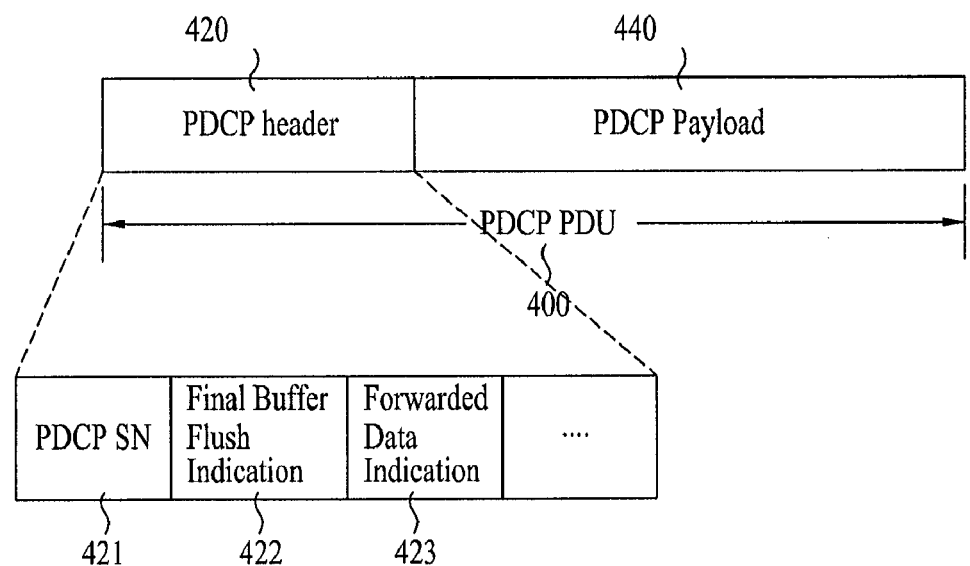
FIG. 4 shows another exemplary PDCP PDU structure for use in embodiments of the present invention.

FIG. 4 shows another exemplary PDCP PDU structure for use in embodiments of the present invention.

Referring to FIG. 4, a PDCP PDU packet 400 may include a PDCP header 420 and a PDCP payload 440. It should be noted that the PDCP PDU packet of FIG. 4 is similar to that of FIG. 3.

Referring to FIG. 4, the PDCP header 420 may include a PDCP sequence number (PDCP SN) 421 and a "Final Buffer Flush Indication" field 422 having one or more bits indicating the last PDU packet. Also, the PDCP header may further include a "Forwarded Data Indication" field 423 having one or more bits indicating where the corresponding packet comes from. FIG. 4 shows that the corresponding packet is transmitted from the serving eNode-B (S-eNB) to the target eNode-B (T-eNB).

If the PDU packet forwarded from the serving eNode-B (S-eNB) includes the "Final Buffer Flush Indication" field 422, the target eNode-B (T-eNB) can recognize that the above PDU packet is the last PDU packet. Furthermore, if the PDU packet forwarded from the serving eNode-B (S-eNB) includes the "Forwarded Data Indication" field 423, the target eNode-B (T-eNB) can recognize a transmission path of the above-mentioned PDU packet. Therefore, the target eNode-B (T-eNB) may reorder a plurality of packets using the "Final Buffer Flush Indication" field 422 and the "Forwarded Data Indication" field 423.

For example, it is assumed that the "Final Buffer Flush Indication" field 422 has only one bit (i.e., 1 bit) and the "Forwarded Data Indication" field 423 has only one bit, and it is also assumed that the corresponding PDU packet is forwarded from the serving eNode-B (S-eNB). In this case, if the "Final Buffer Flush Indication" field 422 is set to "1" and the "Forwarded Data Indication" field 423 is also set to "1", the target eNode-B (T-eNB) may determine that the corresponding PDU packet is the last PDCP PDU packet finally forwarded from the serving eNode-B (S-eNB). Therefore, the target eNode-B (T-eNB) may reorder several PDU packets according to the determined result.

FIG. 5 shows yet another exemplary PDCP PDU structure for use in embodiments of the present invention.

Referring to FIG. 5, the PDCP PDU packet may include a PDU TYPE field 510, a PID field 520, a Direction parameter 530, a Forwarded Data Indication field 540, a Buffer Flush Indication field 550, a Reserve parameter 560, a PDCP Sequence Number field 570, and a PDCP Data PDU Payload field 580.

The PDU TYPE field 510 may indicate a corresponding PDCP PDU type. The PID field 520 may indicate whether or not a header is compressed, a packet type, or a CID. The Direction parameter 530 may indicate a transmission direction of the corresponding PDCP PDU packet. The Forwarded Data Indication field 540 and the Buffer Flush Indication field 550 of FIG. 5 are equal to those of FIG. 3 or 4. The PDCP Sequence Number field 570 may indicate a sequence number of the corresponding PDCP PDU packet. The PDCP data PDU Payload field 580 may indicate the contents of data contained in any real packet.

The following Table 1 shows examples of information elements contained in the PDCP PDU packet.

TABLE 1

| Name | Type | Valid Range | Description |
|---|---|---|---|
| PDU Type | Identifier (3 bits) | 000: PDCP Data PDU<br>001: PDCP Control PDU<br>010-111: Reserved | The PDU type field indicates the PDCP PDU type |

TABLE 1-continued

| Name | Type | Valid Range | Description |
| --- | --- | --- | --- |
| PID | Identifier (5 bits) | 00000: No header compression 00001-11111: Dynamically negotiated header compression identifier | The PID field indicates the used header compression and packet type or a context identifier |
| Direction | Enumerate | 0: UE to eNB 1: eNB to UE | The direction field indicates direction of the PDCP data PDU transmission |
| Forwarded Data Indication | Enumerate | 0: None 1: PDCP Data PDU is forwarded from S-eNB to T-eNB | This field is needed when UE executes the handover and indicates that PDCP Data PDU is forwarded from S-eNB to T-eNB |
| Final Buffer Flush Indication | Enumerate | 0: Forwarded PDCP Data PDU is non last PDCP Data PDU 1: Forwarded PDCP Data PDU is last PDCP Data PDU | This field is needed when UE executes the handover and indicates that S-eNB forwards the last PDCP Data PDU at Buffer |
| PDCP Sequence Number | Identifier | | This field indicates Sequence Number of PDCP Data PDU |
| PDCP Data PDU Payload | Binary | | PDCP Data PDU Payload |

In another exemplary embodiment, a process for reordering PDCP PDU packets by the target eNode-B (T-eNB) will hereinafter be described in detail.

The target eNode-B (T-eNB) transmits data forwarded from the serving eNode-B (S-eNB) to the UE, until receiving a specific message (e.g., a PDCP header including the Buffer Flush Indication field or the other PDCP header including a sequence number of "1" or "0") representing the completion of transmission of all the PDU packets forwarded from the serving gateway (S-GW).

While the target eNode-B (T-eNB) transmits the data forwarded from the serving eNode-B (S-eNB) to the UE, it may store PDU packets (e.g., some PDU packets transmitted along the changed path after the completion of handover) received from the serving gateway (S-GW) in a buffer of the target eNode-B (T-eNB). Also, after the transmission of data from the serving eNode-B (S-eNB) is completed, the target eNode-B (T-eNB) may sequentially transmit the PDU packets stored in the buffer and newly-received PDU packets to the UE.

The target eNode-B (T-eNB) establishes an "Inter PDU arrival" timer (T1) in the PDU packets forwarded from the serving eNode-B (S-eNB), and performs an exception handling on the resultant PDU packets. In other words, the target eNode-B (T-eNB) establishes the T1 timer after receiving one PDCP PDU packet. Prior to the expiration of the T1 timer, the target eNode-B (T-eNB) may receive a PDCP header indicating that there is a failure in receiving the next PDU packet or transmission of the last PDU is completed. In this case, the target eNode-B (T-eNB) may recognize the absence of PDU packets forwarded from the serving eNode-B (S-eNB).

Therefore, the target eNode-B (T-eNB) may sequentially transmit the PDU packets stored in the buffer and the new PDU packets received from the serving eNode-B (S-eNB) to the UE in the order of sequence numbers (SNs).

Provided that the PDU packets forwarded from the target eNode-B (T-eNB) are transmitted to the UE in the wrong order of the sequence numbers (SNs), the UE performs the reordering of the PDU packets and then transmits the reordered PDU packets to an upper layer.

As described above, according to the embodiments of the present invention, the UE performs the handover from the serving eNode-B (S-eNB) to the target eNode-B (T-eNB), and a transmission path of downlink (DL) data is also changed from the serving eNode-B (S-eNB) to the target eNode-B (T-eNB), such that the target eNode-B (T-eNB) may receive wrong-order PDU packets from the target eNode-B (T-eNB). In this case, the target eNode-B (T-eNB) previously reorders of the PDCP PDU packets, and then transmits the reordered PDU packets to the UE. As a result, an amount of load required for the UE performing the above-mentioned reordering can be greatly reduced, and the UE can quickly transmit the received PDU packets to an upper layer.

Figure 6:
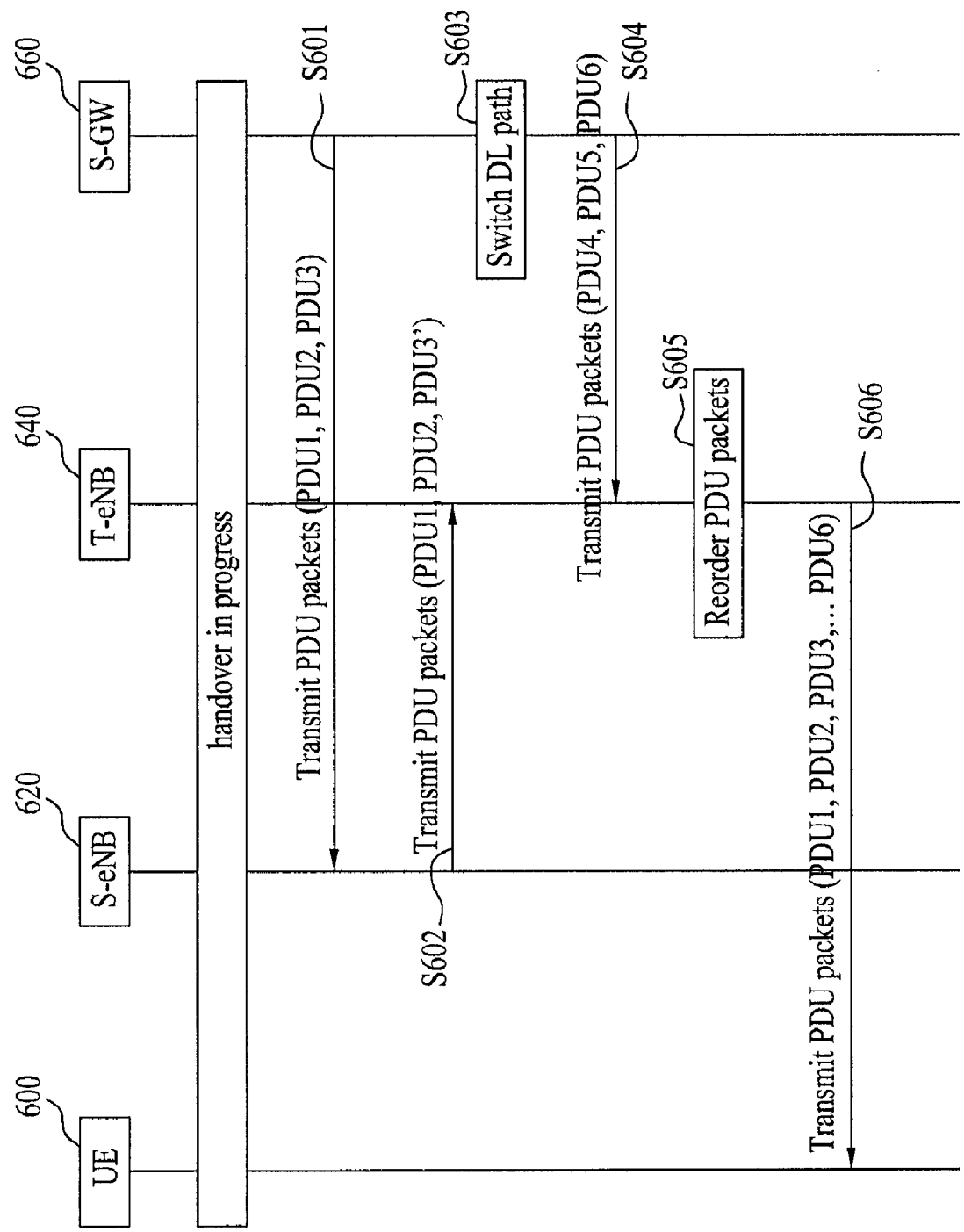
FIG. 6 is a flow chart illustrating a method for reordering PDU packets received in a target eNode-B (T-eNB) during the handover according to one embodiment of the present invention.

FIG. 6 is a flow chart illustrating a method for reordering PDU packets received in the target eNode-B (T-eNB) during the handover according to one embodiment of the present invention.

The system shown in FIG. 6 may include a terminal or an user equipment (UE) 600, a serving eNode-B (S-eNB) 620, a target eNode-B (T-eNB) 640, and a serving gateway (S-GW) 660. For the convenience of description and better understanding of the present invention, it is assumed that the UE 600 performs an exemplary handover from the serving eNode-B (S-eNB) 620 and the target eNode-B (T-eNB) 640.

The serving gateway (S-GW) 660 transmits the SDU acting as user data to the serving eNode-B (S-eNB) 620 transmitting data to the current UE 600. However, it should be noted that the serving gateway (S-GW) 660 segments the SDU into one or more PDCP PDU packets and then transmits the segmented PDCP PDU packets. In this case, it is assumed that the SDU is segmented into 6 PDUs. However, it should be noted that the number of the PDUs formed by the segmentation of the SDU may be changeable according to the size of each data, and may also be changeable according to system requirements.

Referring to FIG. 6, the serving gateway (S-GW) 660 sequentially transmits PDU packets (i.e., PDU1, PDU2, and PDU3) to the serving eNode-B (S-eNB) 620 at step S601.

The serving eNode-B (S-eNB) 620 may command the UE 600 to be handed over to the target eNode-B (T-eNB) 640 on the basis of a measurement report forwarded from the UE 600. Therefore, the serving eNode-B (S-eNB) 620 sequentially forwards PDU packets received from the serving gateway (S-GW) 660 to the target eNode-B (T-eNB) 640 acting as a handover-objective eNode-B at step S602.

At step S602, the serving eNode-B (S-eNB) 620 allows the last PDU packet (i.e., PDU3) to have specific information indicating the last packet, such that it can transmit the resultant last PDU packet (i.e., PDU3') having the specific information to the target eNode-B (T-eNB) 640. In this case, the PDU3 packet may represent a specific packet forwarded from the serving gateway (S-GW) 660 to the serving eNode-B (S-eNB) 620, and the PDU3' packet may represent a specific packet to which an information field indicating the last packet is assigned by the serving eNode-B (S-eNB) 620.

The method of FIG. 3 or 4 may be used at the above step S602. In the case of using the method of FIG. 3, the Buffer Flush Indication field may be contained in a PDCP header of the PDU3' packet. If this Buffer Flush Indication field has one bit and is denoted by '1', the resultant Buffer Flush Indication field having the value of '1' may be forwarded to the target eNode-B (T-eNB) 640.

In the case of using the method of FIG. 4, a Buffer Flush Indication field and a Forwarded Data Indication field are contained in a PDCP header of the PDU3' packet, and each of them is denoted by '1', such that the resultant fields may be transmitted to the target eNode-B (T-eNB) 640. In this case, if the target eNode-B (T-eNB) 640 receives the PDU3' packet, it can definitely recognize that this PDU3' packet is forwarded from the serving eNode-B (S-eNB) 620 and is used as the last PDU packet. Values of the information fields of FIGS. 3 and 4 can be applied to not only the last PDU3 packet but also other packets as necessary.

In accordance with yet another embodiment, after transmitting all of the first to third PDCP PDU packets (PDU1, PDU2, and PDU3), the serving eNode-B (S-eNB) is able to transmit only a PDCP header including a specific sequence number (SN) in order to represent the completion of transmission of all the PDCP PDU packets (PDU1, PDU2, and PDU3) forwarded from the serving gateway (S-GW). This specific sequence number entirely consists of '0' or '1', such that it can indicate the last packet.

Referring to FIG. 6, as the handover is in progress, a path of data forwarded to a downlink may be changed to another path at step S603. That is, a downlink PDCP PDU packet, which has been forwarded from the serving gateway (S-GW) to the serving eNode-B (S-eNB) 620, is forwarded to the target eNode-B (T-eNB) 640.

The serving gateway (S-GW) 660 transmits the remaining PDU packets of the segmented SDU to the target eNode-B (T-eNB) 640 via the changed transmission path at step S604. That is, the serving gateway (S-GW) 660 sequentially transmits the PDU 4, PDU 5, and PDU 6 packets to the target eNode-B (T-eNB) 640.

The target eNode-B (T-eNB) 640 reorders PDU packets forwarded from the serving gateway (S-GW) 660 and other PDU packets received from the serving eNode-B (S-eNB) 620 at step S605.

At step S605, the target eNode-B (T-eNB) 640 reads the value of the information field contained in the header of each PDU packet forwarded from the serving eNode-B (S-eNB) 620, such that it can recognize that the corresponding packets have been forwarded from the serving eNode-B (S-eNB) 620. In addition, since the PDU3' packet has an information bit indicating that the corresponding packet is the last packet forwarded from the serving eNode-B (S-eNB) 620, the target eNode-B (T-eNB) may arrange (or order) several data units received from the serving gateway (S-GW) 660.

The target eNode-B (T-eNB) 640 sequentially transmits the reordered PDU packets of the above step S605 to the UE 600 at step S606.

Figure 7:
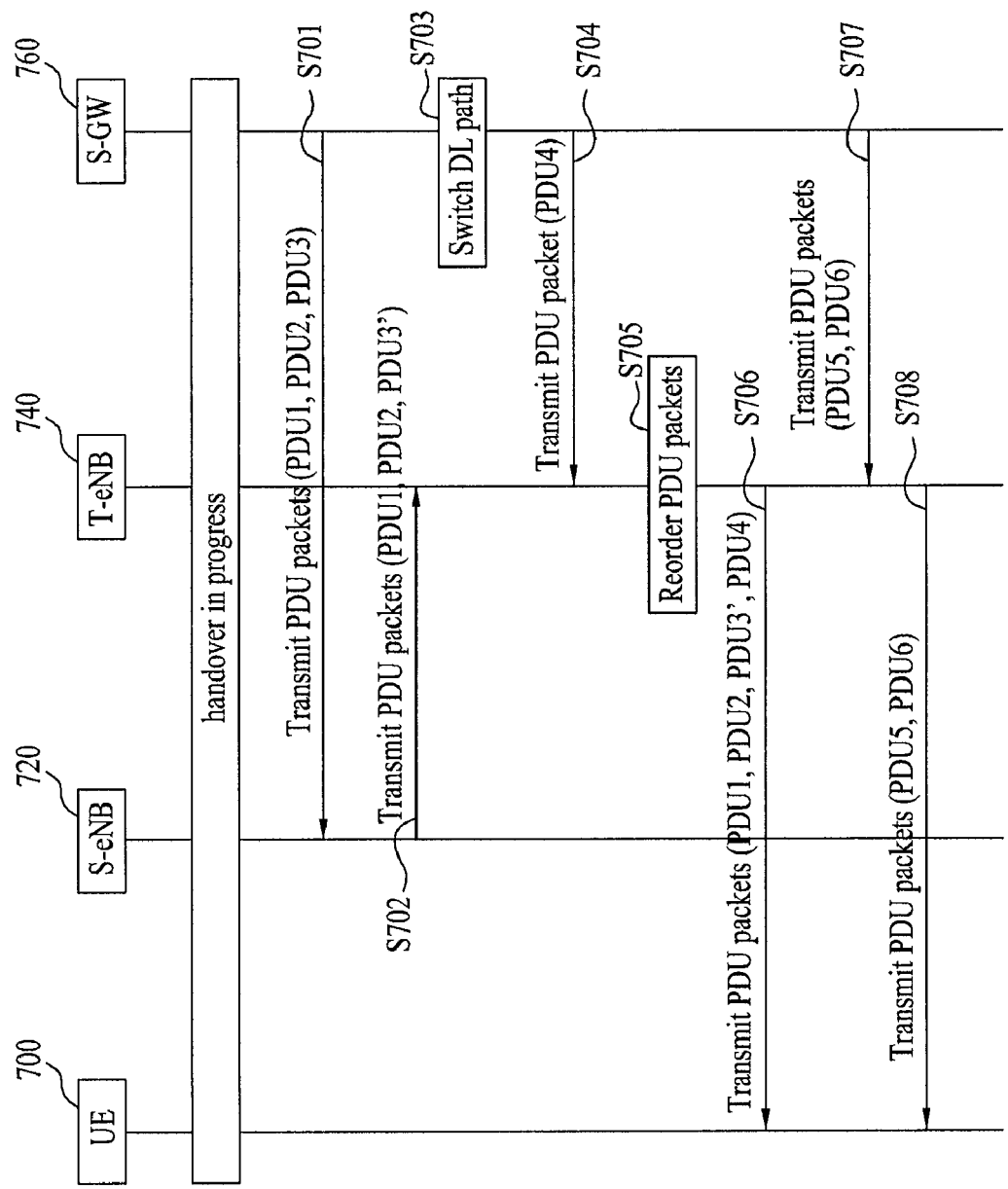
FIG. 7 is a flow chart illustrating a method for reordering PDU packets received in a target eNode-B (T-eNB) during the handover according to another embodiment of the present invention.

FIG. 7 is a flow chart illustrating a method for reordering PDU packets received in the target eNode-B (T-eNB) during the handover according to another embodiment of the present invention.

The system shown in FIG. 7 may include user equipment (UE or, a terminal) 700, a serving eNode-B (S-eNB) 720, a target eNode-B (T-eNB) 740, and a serving gateway (S-GW) 760. For the convenience of description and better understanding of the present invention, it is assumed that the UE 700 performs an exemplary handover from the serving eNode-B (S-eNB) 720 and the target eNode-B (T-eNB) 740.

The serving gateway (S-GW) 760 transmits the SDU acting as user data to the serving eNode-B (S-eNB) 720 transmitting data to the current UE 700. However, it should be noted that the serving gateway (S-GW) 760 segments the SDU into one or more PDCP PDU packets and then transmits the segmented PDCP PDU packets. In this case, it is assumed that the SDU is segmented into 6 PDUs. However, it should be noted that the number of the PDUs formed by the segmentation of the SDU may be changeable according to the size of each data, and may also be changeable according to system requirements.

Referring to FIG. 7, the serving gateway (S-GW) 760 sequentially transmits PDU packets (i.e., PDU1, PDU2, and PDU3) to the serving eNode-B (S-eNB) 720 at step S701.

The serving eNode-B (S-eNB) 720 may sequentially forward PDU packets received from the serving gateway (S-GW) 760 to the target eNode-B (T-eNB) 740 acting as a handover-objective eNode-B at step S702.

At step S702, the serving eNode-B (S-eNB) 720 allows the last PDU packet (i.e., PDU3) to have specific information indicating the last packet, such that it can transmit the resultant last PDU packet having the specific information to the target eNode-B (T-eNB) 740. In this case, the method of FIG. 3 or 4 may be used at the above step S702. In the case of using the method of FIG. 3, the Buffer Flush Indication field may be contained in a PDCP header of the PDU3 packet. If this Buffer Flush Indication field has one bit and is denoted by '1', the resultant Buffer Flush Indication field having the value of '1' may be forwarded to the target eNode-B (T-eNB) 740.

In the case of using the method of FIG. 4, a Buffer Flush Indication field and a Forwarded Data Indication field are contained in a PDCP header of the PDU3 packet, and each of them is denoted by '1', such that the resultant fields may be transmitted to the target eNode-B (T-eNB) 740. In this case, if the target eNode-B (T-eNB) 740 receives the PDU3' packet, it can definitely recognize that this PDU3' packet is forwarded from the serving eNode-B (S-eNB) 720 and is used as the last PDU packet. Values of the information fields of FIGS. 3 and 4 can be applied to not only the last PDU packet but also other packets as necessary.

After transmitting all of the first to third PDCP PDU packets (PDU1, PDU2, and PDU3), the serving eNode-B (S-eNB) 720 is able to transmit only a PDCP header including a specific sequence number (SN) in order to represent the completion of transmission of all the PDCP PDU packets (PDU1, PDU2, and PDU3) forwarded from the serving gateway (S-GW) 760. This specific sequence number entirely consists of '0' or '1', such that it can indicate the last packet.

Referring to FIG. 7, as the handover is in progress, a path of data forwarded to a downlink may be changed to another path at step S703. That is, a downlink PDCP PDU packet, which has been forwarded from the serving gateway (S-GW) 760 to the serving eNode-B (S-eNB) 720, is forwarded to the target eNode-B (T-eNB) 740.

The serving gateway (S-GW) 760 transmits the PDU4 packet of the segmented SDU to the target eNode-B (T-eNB) 740 via the changed transmission path at step S704.

The target eNode-B (T-eNB) 740 stores the PDU4 packet received from the serving gateway (S-GW) 760 in the buffer in order to sequentially transmit the segmented PDU packets to the UE 700. That is, after a current transmission path is changed to another path, PDU packets (e.g. PDU4) received from the serving gateway (S-GW) 760 may be stored in the buffer.

The target eNode-B (T-eNB) 740 may reorder not only the PDU packets received from the serving eNode-B (S-eNB) 720, but also the PDU4 packet received from the serving gateway (S-GW) 760 at step S705.

A reference for the above-mentioned reordering of the above step S705 is the PDU3' packet received from the serving eNode-B (S-eNB) 720. The method for performing the above-mentioned reordering of FIG. 7 is equal to that of FIG. 6.

The target eNode-B (T-eNB) 740 sequentially transmits the PDU packets (i.e., PDU1, PDU2, and PDU3') received from the serving eNode-B (S-eNB) 720 and the PDU4 packet stored in the buffer at step S706.

At step S706, if the target eNode-B (T-eNB) 740 transmits the PDU3' packet to the UE 700, it may recognize that the PDU3' packet is the last packet received from the serving eNode-B (S-eNB) 720 by referring to the Buffer Flush Indication field acting as the information field contained in the PDU3' packet. Therefore, if a downlink (DL) transmission path of the serving gateway (S-GW) 760 is changed to another path, the target eNode-B (T-eNB) 740 may transmit the PDU3' packet to the UE 700, and may then transmit the PDU4 packet directly received from the serving gateway (S-GW) 760 to the UE 700.

The serving gateway (S-GW) 760 sequentially transmits the remaining PDU packets (i.e., PDU5 and PDU6) of the segmented SDU to the target eNode-B (T-eNB) 740 at step S707.

After performing the handover, the target eNode-B (T-eNB) 740 may sequentially transmit the PDU5 and PDU6 packets directly received from the serving gateway (S-GW) 760 at step S708.

As can be seen from FIG. 7, the target eNode-B (T-eNB) 740 sequentially transmits data units forwarded from the serving eNode-B (S-eNB) 720 to the UE 700 without performing an additional reordering step, and sequentially transmits data units forwarded from the serving eNode-B (S-eNB) 720 to the UE 700 without performing the additional reordering step, such that the order of data packets can be rearranged. In this case, the PDU structure of FIG. 3 or 4 is used in the last packet from among data packets forwarded from the serving eNode-B (S-eNB) 720, such that it can be recognized that the corresponding packet is the last packet. As a result, the target eNode-B (T-eNB) 740 can reorder the order of transmitting packets.

Figure 8:
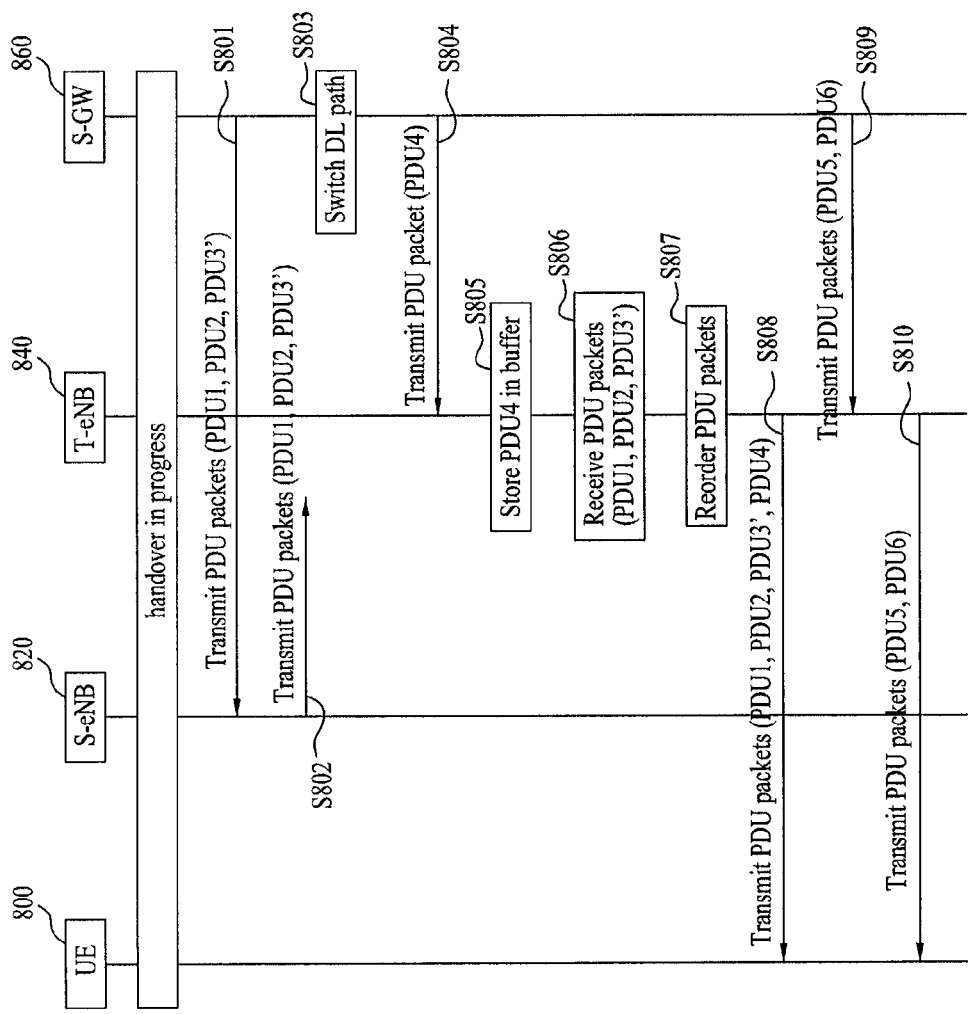
FIG. 8 is a flow chart illustrating a method for reordering PDU packets received in a target eNode-B (T-eNB) during the handover according to yet another embodiment of the present invention.

FIG. 8 is a flow chart illustrating a method for reordering PDU packets received in a target eNode-B (T-eNB) during the handover according to yet another embodiment of the present invention.

The system shown in FIG. 8 may include an user equipment (UE, or a terminal) 800, a serving eNode-B (S-eNB) 820, a target eNode-B (T-eNB) 840, and a serving gateway (S-GW) 860. For the convenience of description and better understanding of the present invention, it is assumed that the UE 800 performs an exemplary handover from the serving eNode-B (S-eNB) 820 and the target eNode-B (T-eNB) 840.

The serving gateway (S-GW) 860 transmits the SDU acting as user data to the serving eNode-B (S-eNB) 820 transmitting data to the current UE 800. However, it should be noted that the serving gateway (S-GW) 860 segments the SDU into one or more PDCP PDU packets and then transmits the segmented PDCP PDU packets. In this case, it is assumed that the SDU is segmented into 6 PDUs. However, it should be noted that the number of the PDUs formed by the segmentation of the SDU may be changeable according to the size of each data, and may also be changeable according to system requirements.

Referring to FIG. 8, the serving gateway (S-GW) 860 sequentially transmits PDU packets (i.e., PDU1, PDU2, and PDU3) to the serving eNode-B (S-eNB) 820 at step S801.

The serving eNode-B (S-eNB) 820 may sequentially forward PDU packets received from the serving gateway (S-GW) 860 to the target eNode-B (T-eNB) 840 acting as a handover-objective eNode-B at step S802.

A method for generating the PDU3' packet at step S802 is equal to that of FIG. 6 or 7. However, since a communication network between the serving eNode-B (S-eNB) and the target eNode-B (T-eNB) is undesirable in FIG. 8, it is difficult for the transmitted PDU packets to be quickly transmitted to the target eNode-B (T-eNB) 840 at step S802. Therefore, although the serving eNode-B (S-eNB) 820 transmits PDU packets to the target eNode-B (T-eNB) 840 at step S802, it is assumed that the target eNode-B (T-eNB) 840 has not yet received the PDU packets.

Referring to FIG. 8, as the handover is in progress, a path of data forwarded to a downlink may be changed to another path at step S803. That is, a downlink PDCP PDU packet, which has been forwarded from the serving gateway (S-GW) 860 to the serving eNode-B (S-eNB) 820, is forwarded to the target eNode-B (T-eNB) 840.

The serving gateway (S-GW) 860 transmits the PDU4 packet of the segmented SDU to the target eNode-B (T-eNB) 840 via the changed transmission path at step S804.

The target eNode-B (T-eNB) 840 stores the PDU4 packet received from the serving gateway (S-GW) 860 in the buffer in order to sequentially transmit the segmented PDU packets to the UE 800. That is, after a current transmission path is changed to another path, PDU packets received from the serving gateway (S-GW) 860 may be stored in the buffer.

As described above, a communication situation between the serving eNode-B (S-eNB) 820 and the target eNode-B (T-eNB) 840 is undesirable. Thus, at step S806, the target eNode-B (T-eNB) 840 may receive the PDU packets of the above step S802 after receiving the PDU4 packet.

Therefore, the target eNode-B (T-eNB) 840 reorders the PDU packets received from the serving eNode-B (S-eNB) 820 and the PDU4 packet received from the serving gateway (S-GW) 860. In this case, a reference for reordering the PDU packets by the target eNode-B (T-eNB) 840 is the PDU3' packet received from the serving eNode-B (S-eNB) 820. A method for carrying out the reordering by the target eNode-B (T-eNB) 840 is similar to that of FIG. 6 or 7 at step S807.

The following steps S808 to S810 of FIG. 8 are equal to steps S706 to S708 of FIG. 7, such that detailed description thereof will herein be omitted for the convenience of description.

Figure 9:
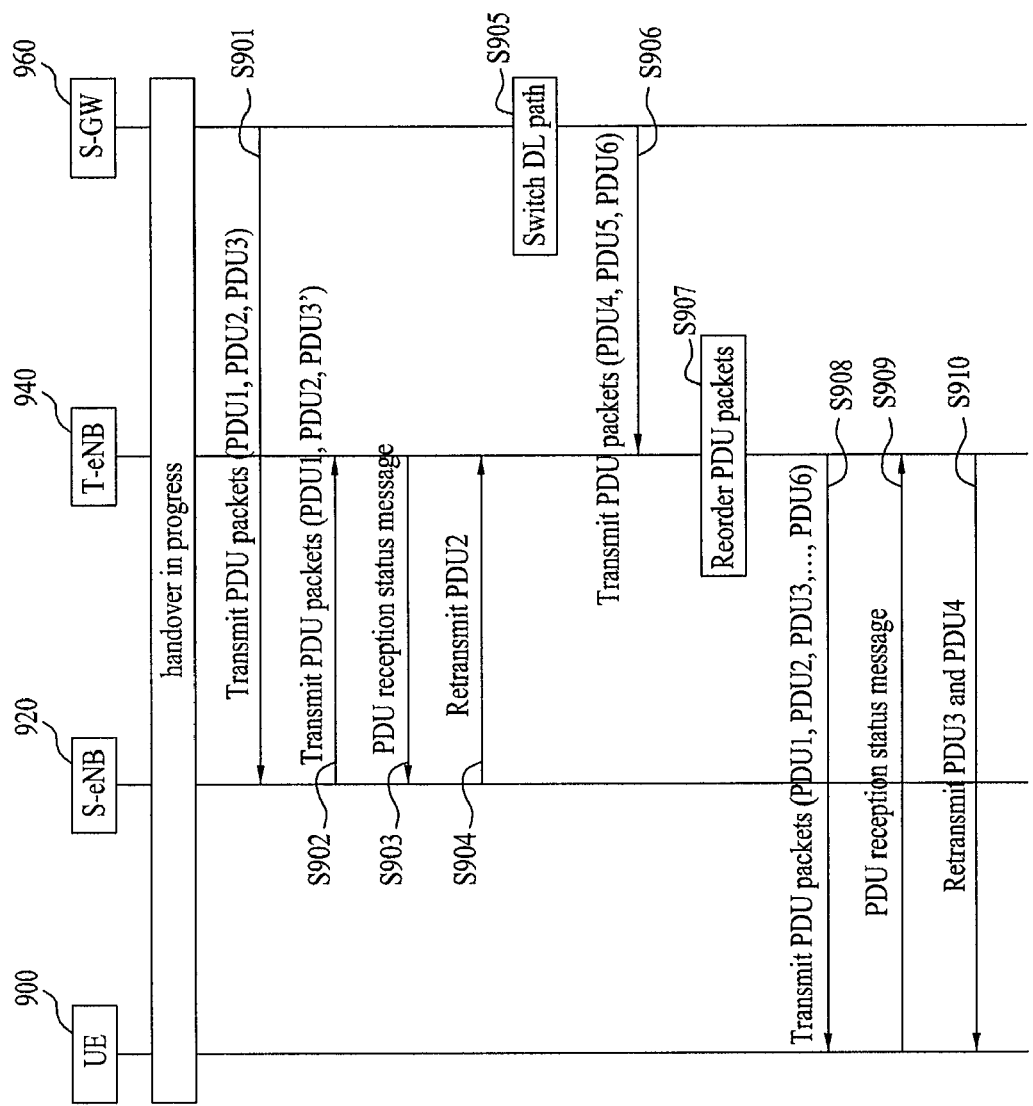
FIG. 9 is a flow chart illustrating a method for reordering PDU packets received in a target eNode-B (T-eNB) during the handover and a method for transmitting reliable data according to yet another embodiment of the present invention.

FIG. 9 is a flow chart illustrating a method for reordering PDU packets received in a target eNode-B (T-eNB) during the handover and a method for transmitting reliable data according to yet another embodiment of the present invention.

The system shown in FIG. 9 may include a terminal or user equipment (UE) 900, a serving eNode-B (S-eNB) 920, a target eNode-B (T-eNB) 940, and a serving gateway (S-GW) 960. For the convenience of description and better understanding of the present invention, it is assumed that the UE 900 performs an exemplary handover from the serving eNode-B (S-eNB) 920 and the target eNode-B (T-eNB) 940.

The serving gateway (S-GW) 960 transmits the SDU acting as user data to the serving eNode-B (S-eNB) 920 transmitting data to the current UE 900. However, it should be noted that the serving gateway (S-GW) 960 segments the SDU into one or more PDCP PDU packets and then transmits the segmented PDCP PDU packets. In this case, it is assumed that the SDU is segmented into 6 PDUs. However, it should be noted that the number of the PDUs formed by the segmentation of the SDU may be changeable according to the size of each data, and may also be changeable according to system requirements.

The following steps S901 and S902 of FIG. 9 are equal to those of FIGS. 6 to 8, such that detailed description thereof will herein be omitted for the convenience of description.

If the target eNode-B (T-eNB) 840 receives the PDU3' packet from the serving eNode-B (S-eNB) 920, it may check an information field contained in a header of the PDU3' packet, and may recognize that the PDU3' packet is the last packet forwarded from the serving eNode-B (S-eNB) 920. Therefore, in order to answer the above-mentioned PDU3' packet, the target eNode-B (T-eNB) 940 transmits a response message (e.g. PDU reception status message) indicating the PDU packet reception status to the serving eNode-B (S-eNB) 920 at step S903.

In order to inform the serving eNode-B (S-eNB) 920 of the received PDU packet status, a PDCP Data PDU Status Report message is defined in this embodiment.

Figure 10:
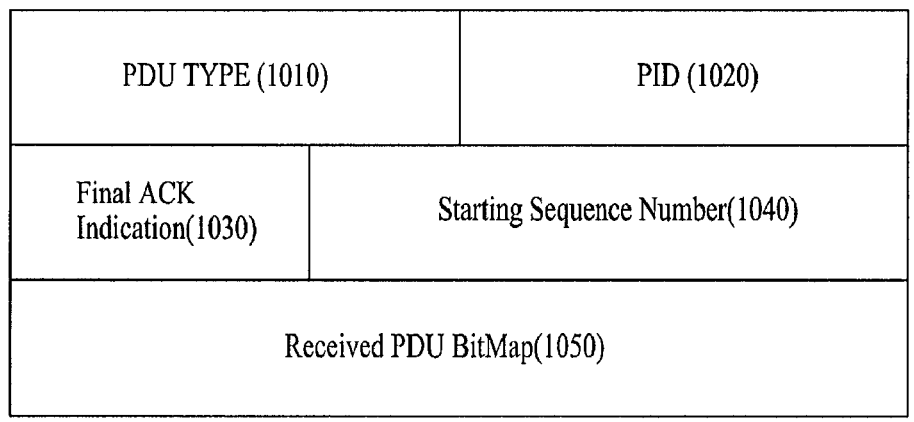
FIG. 10 exemplarily shows a 'PDCP Data PDU Status Report' message according to yet another embodiment of the present invention.

FIG. 10 exemplarily shows a 'PDCP Data PDU Status Report' message according to yet another embodiment of the present invention.

Referring to FIG. 10, the PDCP Data PDU Status Report message may include a PDU TYPE field 1010, a PID field 1020, a Final ACK Indication field 1030, a Starting Sequence Number field 1040, and a Received PDU Bitmap field 1050.

The following Table 2 shows examples of information elements contained in the PDCP Data PDU Status Report message.

TABLE 2

| Name | Type | Valid Range | Description |
| --- | --- | --- | --- |
| PDU Type | Identifier (3 bits) | 000: PDCP Data PDU<br>001: PDCP Control PDU<br>010-111: Reserved | The PDU type field indicates the PDCP PDU type |
| PID | Identifier (5 bits) | 00000: No header compression<br>00001-11111: Dynamically negotiated header compression identifier | The PID field indicates the used header compression and packet type or a context identifier |
| Final ACK Indication | Enumerate | 0: Retransmissions are requested and the PDCP PDU is incomplete<br>1: No retransmissions are requested and this message indicates acknowledgement of all PDCP PDUs | This field indicates whether the entire PDCP PDU is being acknowledged |
| Starting Sequence Number | Identifier | | PDCP SN that will be received next (A value one higher than the highest PDCP SN yet received) |
| Received PDU Bitmap | Enumerate | 0: Negative acknowledgement of the PDCP PDU with PDCP SN<br>1: Positive acknowledgement of the PDCP PDU with PDCP SN | The BBB is a bitmap representing PDCP Sequence Number |

The PDU Type field 1010 of Table 2 represents a type of the corresponding PDCP PDU packet. The PID field 1020 may indicate whether or not a corresponding PDU header is compressed, a packet type, or a CID. The Final ACK Indication field 1030 may indicate whether or not all the received PDCP PDU packets have been successfully received. The Starting Sequence Number field 1040 may indicate a sequence number of the next PDU to be received. The Received PDU Bitmap field 1050 may indicate a sequence number of the received PDCP PDU and the presence or absence of an error in the received PDU.

The PDCP Data PDU Status Report message is defined to guarantee reliable transmission and reception of PDU packets of PDCP data. The PDCP Data PDU Status Report message may be used in not only the serving eNode-B (S-eNB) but also all kinds of entities receiving the PDU packets. Therefore, the UE is able to transmit PDCP PDU packets in an uplink direction, and the eNode-B is able to transmit such PDCP PDU packets in a downlink direction. Upon receipt of the above-mentioned PDU, the UE or the eNode-B transmits the PDCP Data PDU Status Report message to indicate a status of the received PDU.

Referring to FIG. 10, the UE or the eNode-B checks the contents of the PDCP Data PDU Status Report message, and then recognizes a sequence number (SN) of the next PDCP PDU packet to be transmitted or received. That is, by means of the value of the Starting Sequence Number field 1040, a first node for receiving the PDCP PDU packet is able to recognize a sequence number (SN) of the next PDCP PDU packet to be transmitted. In this case, the Starting Sequence Number field 1040 indicates a sequence number (SN) of the next PDCP PDU packet to be transmitted by a second node which has transmitted the PDCP PDU packet. In this case, the term "node" may include the UE or the eNode-B.

For example, if the UE receives the PDCP Data PDU Status Report message including the Starting Sequence Number field 1040 having a specific value of '7' from the eNode-B, the UE transmits the PDCP Data PDU having the SN value of '7' to the eNode-B during the next transmission.

Also, if a first node having transmitted the PDCP PDU packet receives the PDCP Data PDU Status Report message from a second node having received the PDCP PDU packet, it may recognize a sequence number (SN) of the PDCP PDU packet, which must be retransmitted by the first node itself, by referring to information of the Received PDU Bitmap field 1050 contained in the above PDCP PDU Status Report message. The UE or eNode-B having received the PDCP Data PDU Status Report message checks the Received PDU Bitmap field 1050, such that it is able to update information of the Received PDU Bitmap field 1050. An example of the Received PDU bitmap field 1050 is shown in FIG. 11.

Figure 11:
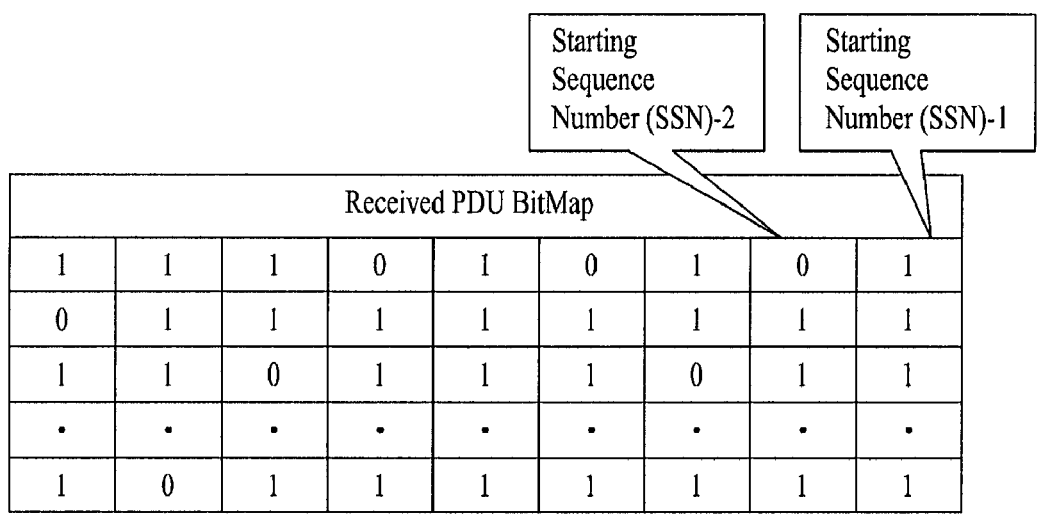
FIG. 11 exemplarily shows a 'Received PDU Bitmap' field contained in a message indicating status information of the received PDU packet according to yet another embodiment of the present invention.

FIG. 11 exemplarily shows the 'Received PDU Bitmap' field contained in a message indicating status information of the received PDU packet according to yet another embodiment of the present invention.

Referring to FIG. 11, if the UE and eNode-B successfully receive the PDCP PDU packets, the value of '1' is set to the Received PDU Bitmap field. Otherwise, if the UE and eNode-B fail to receive the PDCP PDU packets, the other value of '0' is set to the Received PDU Bitmap field.

That is, a first node transmitting the PDCP PDU packet checks the Received PDU Bitmap field contained in the PDCP Data Status Report message which has been transmitted from a second node receiving the PDCP Data PDU, and then retransmits a PDCP PDU packet corresponding to a sequence number having a bitmap filled with '0'. In this case, the Received PDU Bitmap field is initially filled with a sequence number (e.g., Starting Sequence Number−1) of the last PDU received in the node, and is then sequentially filled with those of the remaining PDUs arranged in reverse order. That is, the order of filling the Received PDU Bitmap field is the order from the last received PDU's sequence number to the firstly-received PDU's sequence number.

For example, if the serving eNode-B (S-eNB) has successfully received all the PDU packets forwarded from the serving gateway (S-GW), it checks the Received PDU Bitmap field contained in the PDCP Data Status Report message, and allows the Received PDU Bitmap field to be entirely filled with '1', and transmits the resultant Received PDU Bitmap field entirely filled with '1'. Also, the Final ACK Indication field 1030 is set to '1', such that the successful reception of all the PDCP PDU packets may be informed to the serving gateway (S-GW). Therefore, reliable data transmission between the serving eNode-B and the serving gateway can be implemented by the PDCP Data PDU Status Report message.

The PDCP Data Status Report message can be used between the serving eNode-B and the serving gateway, can be used between the serving gateway and the target eNode-B, and/or can also be used between the UE and the eNode-B.

Detailed operations of the above-mentioned description will hereinafter be described with reference to FIG. 9.

Referring back to FIG. 9, if the target eNode-B (T-eNB) 940 transmits a message indicating a PDU packet reception status to the serving eNode-B (S-eNB) at step S903, the PDCP Data PDU Status Report message defined in FIG. 10 may be used. The "Received PDU Bitmap" field contained in the PDCP Data PDU Status Report message may indicate that the PDU2 packet has not been successfully received.

Therefore, the serving eNode-B (S-eNB) 920 having received the PDCP Data Status Report message checks a bitmap, such that it retransmits the PDU2 packet, which has not been successfully transmitted, to the target eNode-B (T-eNB) 940 at step S904.

Referring to FIG. 9, as the handover is in progress, a path of data forwarded to a downlink may be changed to another path at step S905. That is, a downlink PDCP PDU packet, which has been forwarded from the serving gateway (S-GW) 960 to the serving eNode-B (S-eNB) 920, is forwarded to the target eNode-B (T-eNB) 940.

The serving gateway (S-GW) 960 sequentially transmits the PDU4, PDU5, and PDU6 packets to the target eNode-B (T-eNB) 940.

The target eNode-B (T-eNB) 940 reorders PDU packets forwarded from the serving gateway (S-GW) 960 and other PDU packets received from the serving eNode-B (S-eNB) 920 at step S907.

At step S907, the target eNode-B (T-eNB) 940 reads the value of the information field contained in the header of each PDU packet forwarded from the serving eNode-B (S-eNB) 920, such that it can recognize that the corresponding packets have been forwarded from the serving eNode-B (S-eNB) 920. In addition, since the PDU3' packet has an information bit indicating that the corresponding packet is the last packet forwarded from the serving eNode-B (S-eNB) 920, the target eNode-B (T-eNB) may arrange (or order) several data units, which have been received from the serving gateway (S-GW) 960 after the reception time of the PDU3' packet.

The target eNode-B (T-eNB) 940 sequentially transmits the reordered PDU packets of the above step S907 to the UE 900 at step S908.

The UE 900 having received all the above-mentioned PDU packets may transmit a message indicating the PDU reception status to the target eNode-B (T-eNB) 940 at step S909.

In this case, the PDCP Data PDU Status Report message may be used at step S909, and the "Received PDU Bitmap" field contained in this PDCP Data PDU Status Report message may indicate status information of the PDU packets received from the target eNode-B (T-eNB). In this embodiment, it is assumed that the UE fails to normally receive the PDU3 and PDU4 packets.

The target eNode-B (T-eNB) 940, which has received the PDCP Data PDU Status Report message from the UE 900, checks the Received PDU Bitmap field contained in the PDCP Data PDU Status Report message, such that it may retransmit the PDU3 and PDU4 packets at step S910.

As can be seen from the above-mentioned embodiment of FIG. 9, the target eNode-B (T-eNB) 940 reorders the order of PDU packets, and transmits the reordered PDU packets to the UE 900, resulting in the reduction of overload caused by the packet reordering at the UE 900.

The above embodiments are proposed by combining constituent components and characteristics of the present invention according to a predetermined format. If required, individual constituent components or characteristics may be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It is obvious to those skilled in the art that claims having no explicit citation relationships are combined with each other to implement the embodiments, or new claims obtained by the amendment after the patent application may also be contained in the present invention without departing from the scope or spirit of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the above-mentioned embodiments of the present invention can be applied to a variety of wireless access systems.

The invention claimed is:

1. A method of transmitting packets at a serving base station in case of a mobile station performing handover, the method comprising:
   receiving a series of packets from an upper layer entity;
   transmitting the series of packets sequentially to a target base station,
   wherein a packet of the series of packets includes a packet type field indicating a type of the series of packets and an information field which represents whether the packet is the last transmitted;
   receiving a reception status message regarding the series of packets from the target base station, the reception status message including a bitmap field and a starting sequence number field, the bitmap field indicating whether an error of the series of packets is detected in order from a last transmitted packet to a first transmitted packet, the starting sequence number field indicating a sequence number of a next packet to be transmitted by the serving base station; and
   retransmitting at least one error-detected packet to the target base station according to the reception status message.

2. The method of claim 1, wherein the information field further includes information indicating that the series of packets are transmitted from the serving base station.

3. The method of claim 1, wherein transmitting the series of packets sequentially to the target base station comprises:
   transmitting a packet data convergence protocol (PDCP) header including a sequence number, wherein the sequence number represents completion of the transmitting of the series of packets, after all of the series of packets are transmitted.

4. The method of claim 3, wherein the sequence number entirely consists of '1' or '0'.

5. A method of transmitting reordered packets at a target base station in case of a mobile station performing handover, the method comprising:
   receiving a series of first packets sequentially from a serving base station, wherein a first packet of the series of first packets includes an information field indicating whether the first packet is last transmitted;
   receiving a series of second packets sequentially from an upper layer entity;
   reordering an order of the received packets;
   transmitting the reordered packets to the mobile station;
   receiving a reception status message regarding the transmitted reordered packets from the mobile station, the reception status message including a bitmap field and a starting sequence number field, the bitmap field indicating whether an error of the transmitted reordered packets is detected in order from a last transmitted packet to a first transmitted packet, the starting sequence number field indicating a sequence number of a next packet to be transmitted by the target base station; and
   retransmitting at least one error-detected packet to the mobile station according to the reception status message.

6. The method of claim 5, further comprising,
   after receiving the series of second packets,
   storing the series of second packets to a buffer of the target base station.

7. The method of claim 6, wherein the series of second packets are stored to the buffer, and are transmitted after all of the series of first packets are transmitted.

8. The method of claim 6, wherein the information field further includes information indicating that the first packet is the last transmitted packet from the serving base station.

9. The method of claim 6, further comprising:
   receiving a packet data convergence protocol (PDCP) header including a sequence number from the serving base station, the sequence number representing completion of transmission of the first series of packets.

10. The method of claim 9, wherein the sequence number entirely consists of '1' or '0'.

* * * * *